May 24, 1960 S. J. BEGUN ET AL 2,938,195

MULTICHANNEL MAGNETIC RECORDING

Filed July 8, 1954 4 Sheets-Sheet 1

INVENTORS.
SEMI JOSEPH BEGUN
GIM P. CHAN
ALFRED P. DANK
BY William J. Flynn
ATTORNEY May 24, 1960 S. J. BEGUN ET AL 2,938,195

MULTICHANNEL MAGNETIC RECORDING

Filed July 8, 1954 4 Sheets-Sheet 2

INVENTORS.
SEMI JOSEPH BEGUN
GIM P. CHAN
ALFRED P. DANK
BY William J. Flynn
ATTORNEY May 24, 1960 S. J. BEGUN ET AL 2,938,195

MULTICHANNEL MAGNETIC RECORDING

Filed July 8, 1954 4 Sheets-Sheet 3

*INVENTORS.*
SEMI JOSEPH BEGUN
GIM P. CHAN
ALFRED P. DANK

BY William J. Flynn
ATTORNEY

INVENTORS.
SEMI JOSEPH BEGUN
GIM P. CHAN
ALFRED P. DANK

BY William J. Flynn
ATTORNEY 2,938,195
Patented May 24, 1960

2,938,195

MULTICHANNEL MAGNETIC RECORDING

Semi Joseph Begun, Cleveland Heights, and Gim P. Chan and Alfred P. Dank, Euclid, Ohio, assignors to Clevite Corporation, Cleveland, Ohio, a corporation of Ohio Filed July 8, 1954, Ser. No. 442,064

4 Claims. (Cl. 340—174)

This invention relates to an arrangement for facilitating the selective adjustment of the phase relation among the several signals recorded at different channels on a multichannel magnetic record tape.

In the art of geophysical prospecting for oil or other mineral deposits, a commonly used technique involves firing an explosive shot in the ground and making simultaneous recordings of the seismic reflections picked up by several geophones spaced in a predetermined pattern away from the shot point. One type of equipment used for this purpose employs multichannel magnetic recording of the seismic reflections. Ultimately, of course, for the interpretation of these recordings it is necessary that a visual reproduction be made. Accordingly, in playing back the different magnetic record signals the operator makes selective adjustments of the phase, or time, relationship among the signals at the different channels on the multichannel magnetic record to aid him in the interpretation of the recorded information. For example, it may be desired to change the phase relation among the several signals in order to correct for phase differences due to the different positions of the respective geophones which picked up the seismic reflections during the recording interval. In order to make such phase adjustment among the signals at the several channels on the multichannel magnetic record, it has been proposed heretofore to adjust the respective positions of the magnetic playback heads along the respective signal channels on the multichannel magnetic record. In practice, this approach is not feasible because of the close spacing between the signal channels on the multichannel magnetic record, which does not readily admit of such adjustment of the magnetic heads.

In accordance with the present invention, such phase adjustment among the several signals on a multichannel magnetic recording is made practicable by first re-recording magnetically onto several separate records the signals which were originally recorded simultaneously on a single multichannel record. During this re-recording the same phase relationship among the signals as prevailed during the original recording is maintained. The several records at which the signals are re-recorded are mounted on individual rotary drums, which are driven in unison, and the magnetic heads associated with these records are mounted on the respective drums for convenient adjustment along the length of the respective records to vary the phase relationship among the several signal channels upon playback from these records to the apparatus which makes the visual reproduction.

It is, therefore, an object of the present invention to provide a novel arrangement in a multichannel magnetic recording and reproducing apparatus which has provision for adjusting the phase relationship among the several signals in a more convenient and effective manner.

It is also an object of this invention to provide a novel arrangement for adjusting the phase relationship among several magnetically recorded signals which has provision for transferring the individual signals from a single multichannel record tape, on which they were recorded originally, onto separate magnetic records mounted for movement in unison and adjacent which are located magnetic heads mounted for limited adjustment along the respective records to adjust the phase relationship among the several signals.

A further object of this invention is to provide a novel and improved method for the magnetic recording and reproducing of several transient signals, such as the signals picked up by geophones in geophysical prospecting.

Other and further objects and advantages of the present invention will be apparent from the following description of the preferred embodiment thereof, which is illustrated in the accompanying drawings and described in detail in the following description.

Figure 1:
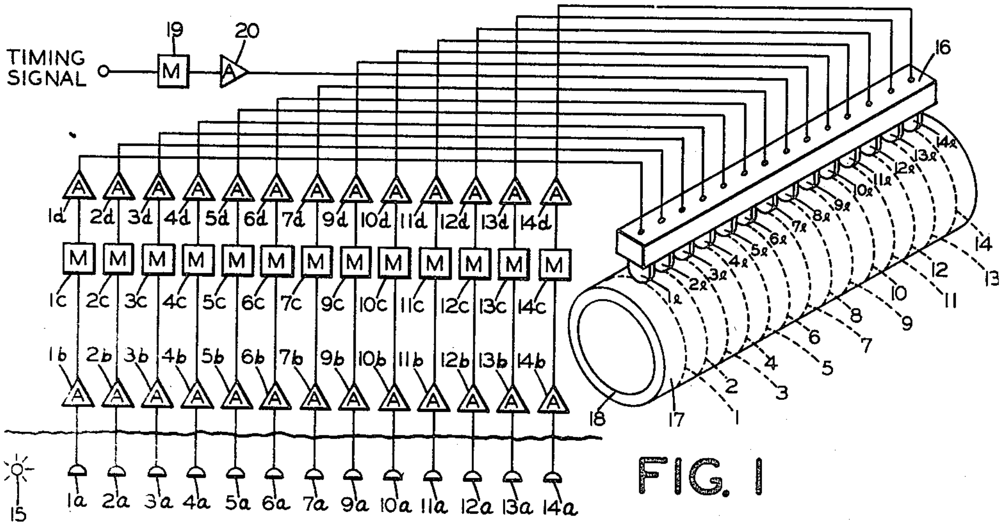
Figure 1 is a schematic diagram showing mechanism for recording on a multichannel magnetic record the seismic reflections picked up by geophones spaced from an explosion shot point.

Referring first to Fig. 1, in accordance with a known technique there may be made a multichannel magnetic recording of seismic reflections following the firing of an explosive shot in the ground. During such recording, the seismic reflections picked up by the geophones, or seismometers, *1a*—*7a* and *9a*—*14a*, which are spaced in a predetermined pattern away from the shot point 15, are supplied as electrical signals to respective amplifiers *1b*—*7b* and *9b*—*14b*. After amplification the seismic signals are used to frequency modulate corresponding higher frequency carrier signals in the multivibrator-type modulators *1c*—*7c* and *9c*—*14c*, respectively, and the frequency modulated carrier outputs from the modulators are supplied through amplifiers *1d*—*7d* and *9d*—*14d*, respectively, to the respective magnetic recording and reproducing heads *1e*—*7e* and *9e*—*14e*, respectively.

The magnetic heads are mounted in a common housing 16 to provide a multichannel magnetic head assembly which has the recording/reproducing gaps of the respective heads extending in alignment across the multichannel magnetic record tape 17. The record tape is mounted on a drum 18 which rotates at constant speed to move the respective information signal channels 1—7 and 9—14 on the record tape past the recording gaps of the overlying magnetic heads. Also, a reference timing signal of a predetermined constant frequency is used to modulate a multivibrator-type modulator 19 and after amplification by the amplifier 20, the output from this modulator is applied to a magnetic recording head 8*e* which overlies the signal channel 8 midway across the record tape 17. The purpose of recording this timing signal is to control the playback speed of the record tape from the reproduced timing signal, so that no appreciable error is introduced into the reproduction due to differences in the record tape speed during the original recording and the later playback from this recording.

After the original recording, the record tape 17 is removed from the drum 18 and taken to the laboratory where the analysis and interpretation of the recording is to be made. From its very nature, of course, the magnetic record provides a permanent "memory" which will not deteriorate substantially with time, so that it is particularly suitable for applications, such as in geophysical prospecting, where the ultimate analysis and interpretation may not be made until a considerable time after the original recording.

For the analysis and interpretation of the record, a known technique involves selectively altering the phase relationship among the signal channels, so that the more significant responses may be emphasized and the spurious responses minimized. However, in actual practice, a fourteen channel magnetic record tape, such as mentioned above, would have a width of only two inches and the spacing between adjacent signal channels across the record tape would be only ⅛ inch. Obviously, because of this close spacing it would be quite difficult and impracticable to mount the several magnetic playback heads for the individual, closely-spaced signal channels across the record tape such that these heads would be individually adjustable along the length of the record tape. Accordingly, in accordance with the present invention there is provision for transferring the recorded signals from the respective closely-spaced channels on the multichannel record tape onto plural magnetic record apparatus which comprises a plurality of separate magnetic record media carried by a common shaft, with the several magnetic recording and reproducing heads being mounted for adjustment about the shaft along the respective record tracks on these record media.

Figure 2:
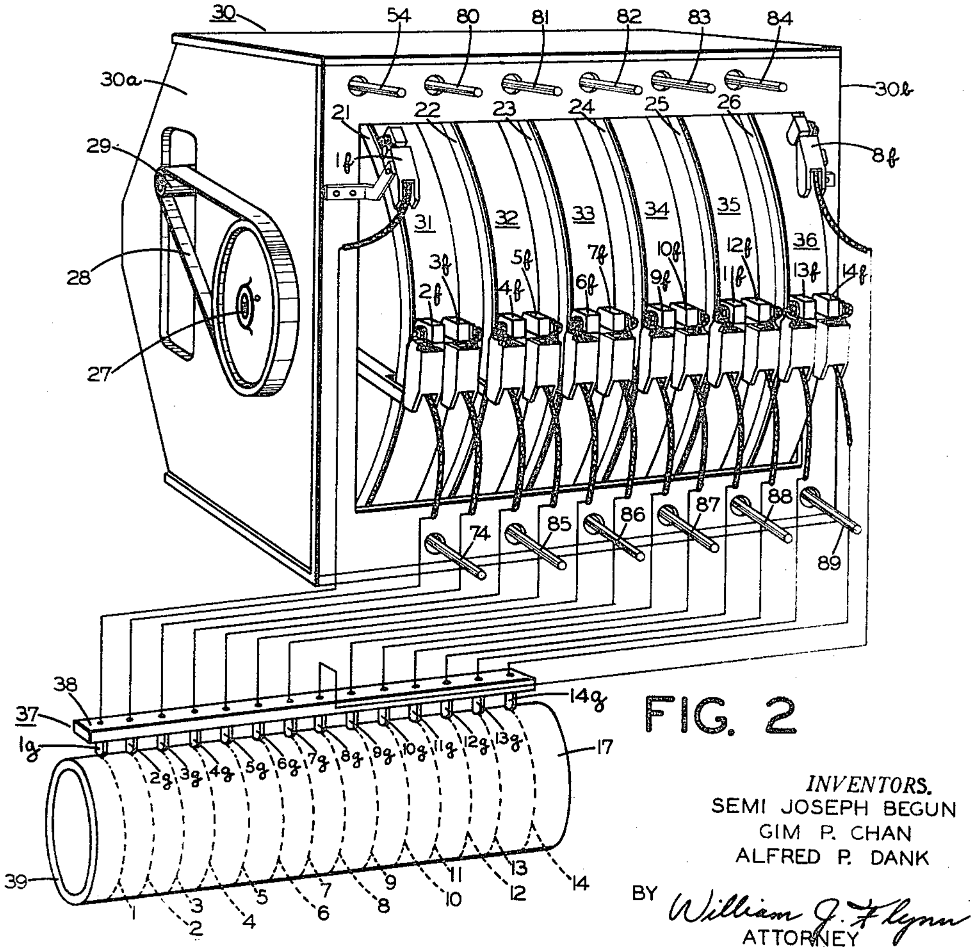
Figure 2 is a schematic diagram showing mechanism for the transfer of the recorded seismic signals from the single multichannel magnetic record onto the plural magnetic record apparatus of the present invention.

To this end there is provided the re-recording unit shown generally in Fig. 2. A series of six axially spaced cylindrical drums 21—26 are mounted centrally on a common rotary shaft 27 which is driven through a belt drive 28 from the drive shaft 29 of a drive motor (not shown) mounted within the housing 30. The drums carry on their cylindrical peripheries magnetic record media 31—36, respectively, in the form of endless bands of rubber impregnated with magnetizable material. At the front of the housing there are located a series of magnetic recording/reproducing heads 1*f*—14*f*, which overlie respective channels of the several record media. The heads 1*f* and 8*f* are mounted fixedly to overlie respective record channels on the record media 31 and 36, respectively. The heads 2*f* and 3*f* are mounted for limited adjustment along the record 31 on drum 21; the heads 4*f* and 5*f* are similarly mounted for adjustment along the record 32 on drum 22; the heads 6*f* and 7*f* are mounted for adjustment along the record 33 on drum 23; the heads 9*f* and 10*f* are mounted for adjustment along the record 34 on drum 24; the heads 11*f* and 12*f* are mounted for adjustment along the record 35 on drum 25; and the heads 13*f* and 14*f* are mounted for adjustment along the record 36 on drum 26.

The heads 1*f*—14*f* are individually connected electrically to the individual heads 1*g*—14*g* of a multichannel magnetic playback head unit 37. These heads 1*g*—14*g* are carried by a common housing 38 and have their playback gaps in precise alignment across the multichannel record tape 17 mounted on a rotary cylindrical drum 39, identical to the multichannel magnetic head assembly at the original recording unit (Fig. 1). In re-recording from the original single multichannel record tape 17, the playback heads 1*g*—14*g* overlie the respective channels 1—14 on the original record tape, and as the drum 39 rotates to move this record tape past the playback head unit 37 at uniform speed the playback heads 1*g*—14*g* reproduce the individual signals in exactly the same phase relationship as they were originally recorded. The signals recovered from the respective channels on the multichannel record 17 are applied to the re-recording heads 1*f*—14*f*, which re-record these signals on the respective separate record media 31—36 as the supporting drums 21—26 are rotated in unison at uniform speed past the re-recording heads. Preferably in accordance with the present invention the frequency modulated signals on the multichannel record 17 are re-recorded on the plural records 31—36 without first having been demodulated or otherwise modified. This insures that none of the signal information is lost in the re-recording, or signal transfer, step. Since the plural records are in the form of endless bands, the re-recording onto these records can begin at any location along their respective lengths on the peripheries of the drums.

Figure 3:
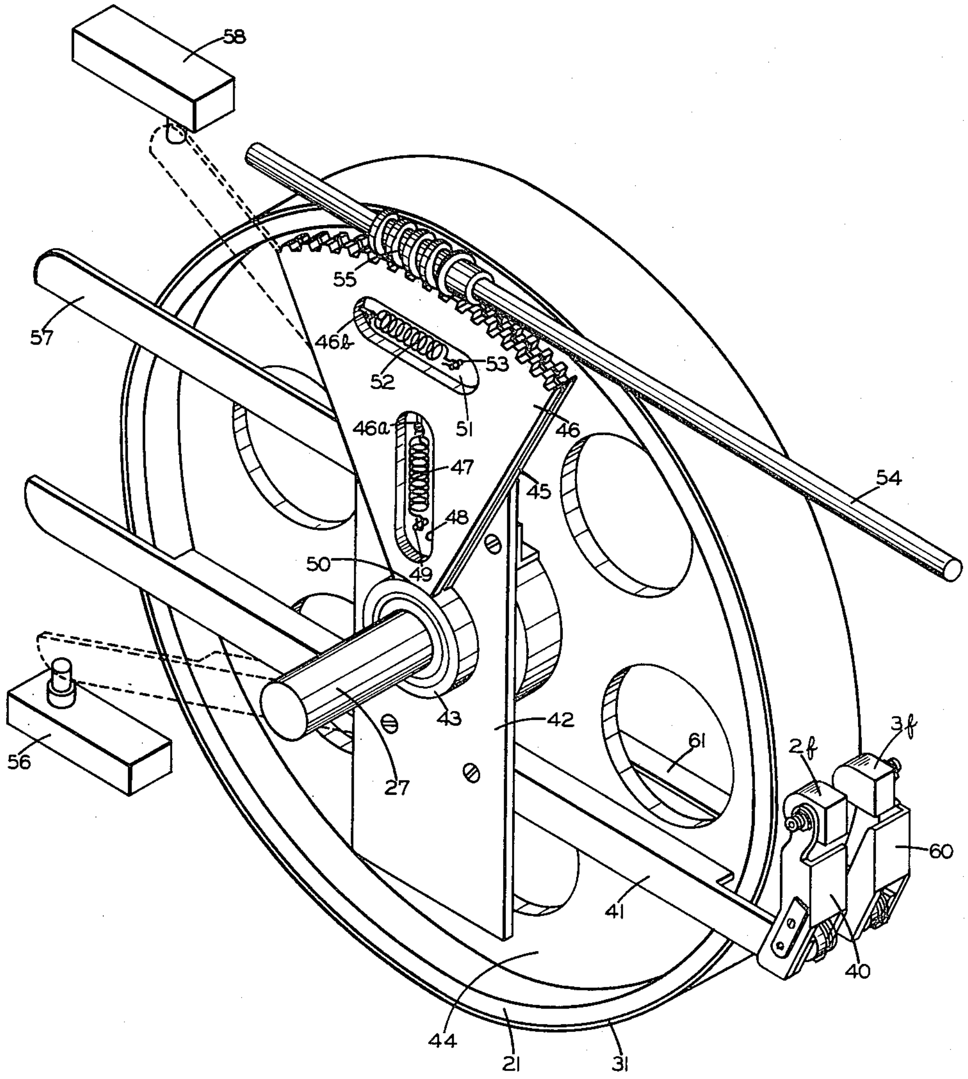
Figure 3 is a fragmentary perspective showing the mounting for the adjustable head at one side of each of the drums in the plural magnetic record apparatus.

Considering now the specific mounting of the adjustable heads in the re-recording equipment, referring to Fig. 3, the magnetic head 2*f* is carried by a bracket 40 pivotally connected to one end of an angle bar 41. At its middle the angle bar 41 is secured to a plate 42. Plate 42 is secured to an annular ball bearing sleeve 43 mounted for rotation about the shaft 27 to which the internal web 44 of drum 21 is secured. An inner gear sector 45 is secured to the plate 42 at the opposite side of the sleeve 43 from the bar 41. Contiguously overlying the inner gear sector 45 is an identical outer gear sector 46, which is separate from the rigid assembly of plate 42, sleeve 43 and the inner gear sector 45. A tension coil spring 47 is located in an opening 48 in the outer gear sector 46 and has its upper end secured to an eyebolt 46*a* carried by the outer gear sector 46 and its lower end secured to a pin 49 carried by gear sector 45. Spring 47 exerts a radially inward pull on gear sector 46 to maintain the arcuate inner face 50 of this gear sector tightly against the complementary cylindrical outer periphery of sleeve 43, thereby positioning the toothed radially outward periphery of the outer gear sector 46 even with toothed outer periphery of the inner gear sector 45.

Toward its outer, toothed periphery the outer gear sector 46 is formed with an opening 51 at which is located a coil spring 52, which is under tension between its connection at one end to an eyebolt 46*b* carried by the outer gear sector 46 and its connection at the other end to a pin 53 carried by the inner gear sector 45. Spring 52 biases the outer gear sector 46 to have its gear teeth slightly offset from the gear teeth on the contiguous inner gear sector 45.

A manually adjustable rotatable shaft 54, which extends out beyond the front of the housing 30 at the upper end thereof (Fig. 2), carries a worm 55 which meshes with the teeth on gears 45, 46 to turn the latter in response to rotation of shaft 54. The described spring connection between the gears 45 and 46 is a conventional anti-backlash arrangement which substantially eliminates lost motion between the worm 55 and these gears.

When shaft 54 is turned then the gears 45, 46, plate 42 and angle bar 41 turn as a unit about shaft 27, thereby moving the head 2*f* lengthwise along the record 31.

Where it is intended to shift the magnetic head 2*f* sequentially to different positions upon successive rotations of the drum shaft 27 during a series of playback operations, then the worm shaft 54 might be motor driven automatically, rather than turned by hand. In such case the successive positions of the magnetic head might be determined by a computer controlling the operation of the drive motor for the worm shaft 54. In order to prevent turning the worm shaft too far in either direction so that the gears 45, 46 would be disengaged from the worm 55, there is provided a limit switch arrangement arranged to de-energize the drive motor for worm shaft 54 upon overtravel of the worm shaft in either direction. The opposite end of angle bar 41 projects beyond the opposite peripheral edge of drum 21 and is positioned to engage and actuate a limit switch 56 upon displacement of the magnetic head 2f a sufficient amount counterclockwise in Fig. 2. The plate 42 also carries at the opposite side of the sleeve 43, an angle bar 57 which has its outer end positioned to engage and actuate another limit switch 58 upon displacement of the head 2f a sufficient amount clockwise in Fig. 3. In one practical embodiment, each of the limit switches 56 and 58 would be in series in the energization circuit for the drive motor of the worm shaft 54 and would be normally closed. Upon actuation by the corresponding angle bar 41 or 57 either limit switch would thereby be opened and would de-energize the drive motor for worm shaft 54.

Each of the magnetic heads 4f, 6f, 9f, 11f and 13f has an individual mounting on shaft 27 identical to that just described for head 2f. These heads are adjustable individually a limited amount along the records on the peripheries of the respective drums by means of rotatable shafts 80, 81, 82, 83 and 84, respectively. Suitable limit switch arrangements, identical to that just described, are provided to define the opposite limits of displacement of these heads when the adjustment of these heads is through the automatically controlled motor drive.

Figure 4:
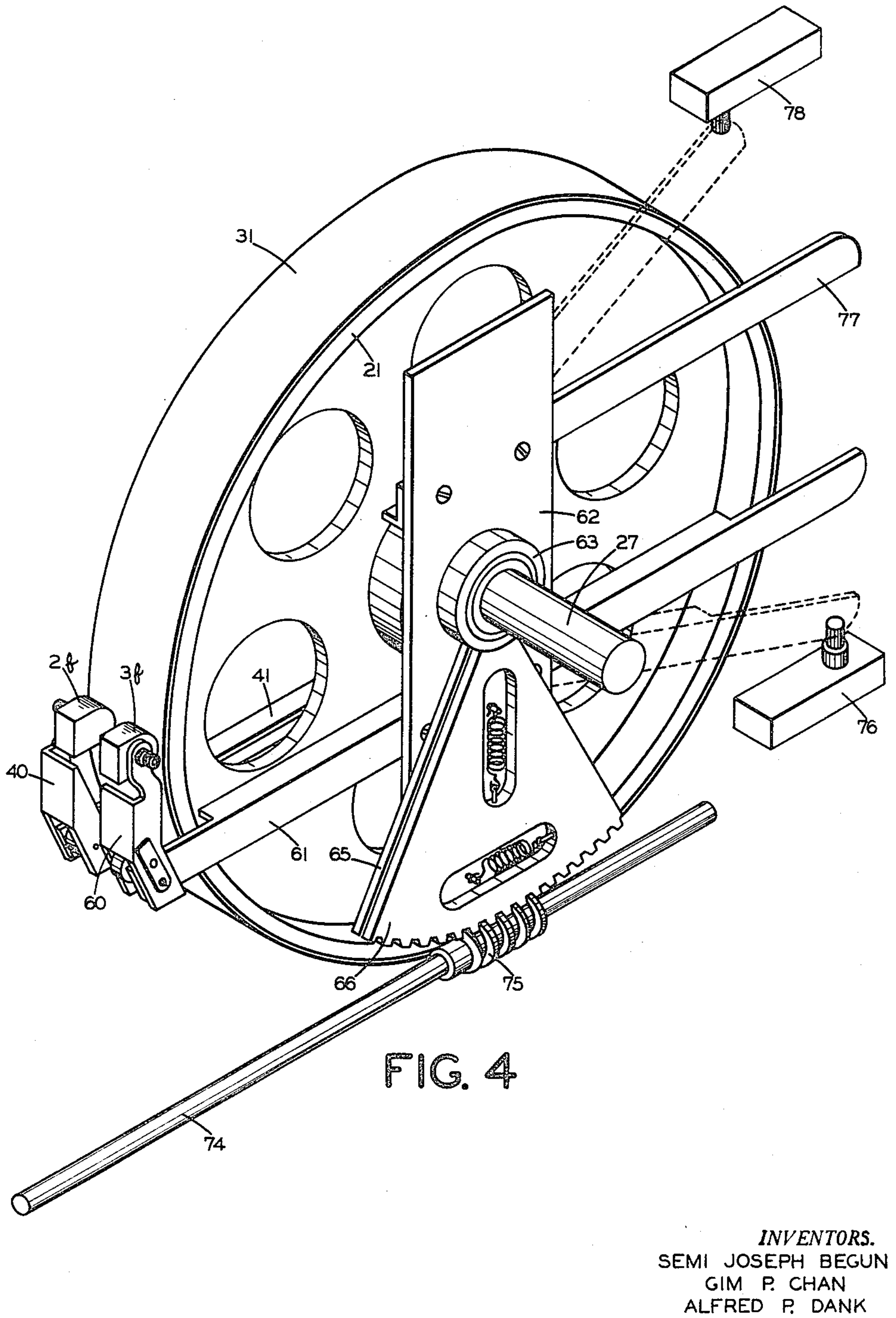
Figure 4 is a similar view showing the mounting for the adjustable head at the opposite side of the drum.

At the opposite side of drum 31 (Fig. 4) there is provided an angle bar 61 on whose outer end the support bracket 60 for the magnetic head 3f is pivotally mounted. Referring to Fig. 4, the angle bar 61 is secured to a plate 62 which is attached to an annular sleeve 63 rotatable about the drum shaft 27. An anti-backlash gear assembly including the inner and outer gear sectors 65, 66 identical to that just described, is mounted on plate 62 to impart rotation to the plate in response to turning of the shaft 74 carrying a worm 75 which meshes with the teeth on the gear sectors 65, 66. A limit switch 76 is positioned to be engaged and actuated by the back end of the angle bar 61 upon displacement of the latter a sufficient amount clockwise in Fig. 4. Another limit switch 78 is positioned to be engaged and actuated by the back end of an angle bar 77 attached to plate 62 at the opposite side of the drum shaft 27 from the attachment of angle bar 61.

The magnetic heads 5f, 7f, 10f, 12f, and 14f, are individually mounted at the opposite side of the respective drums 22—26, respectively, in identical fashion to the illustrated mounting for head 3f. The individual adjustment of each of these latter heads along its record is effected by turning the corresponding shaft 85, 86, 87, 88 or 89. Similar limit switch arrangements, identical to that for head 3f, are provided to limit the displacement of these heads in either direction along the respective drums.

Figures 5, 6:
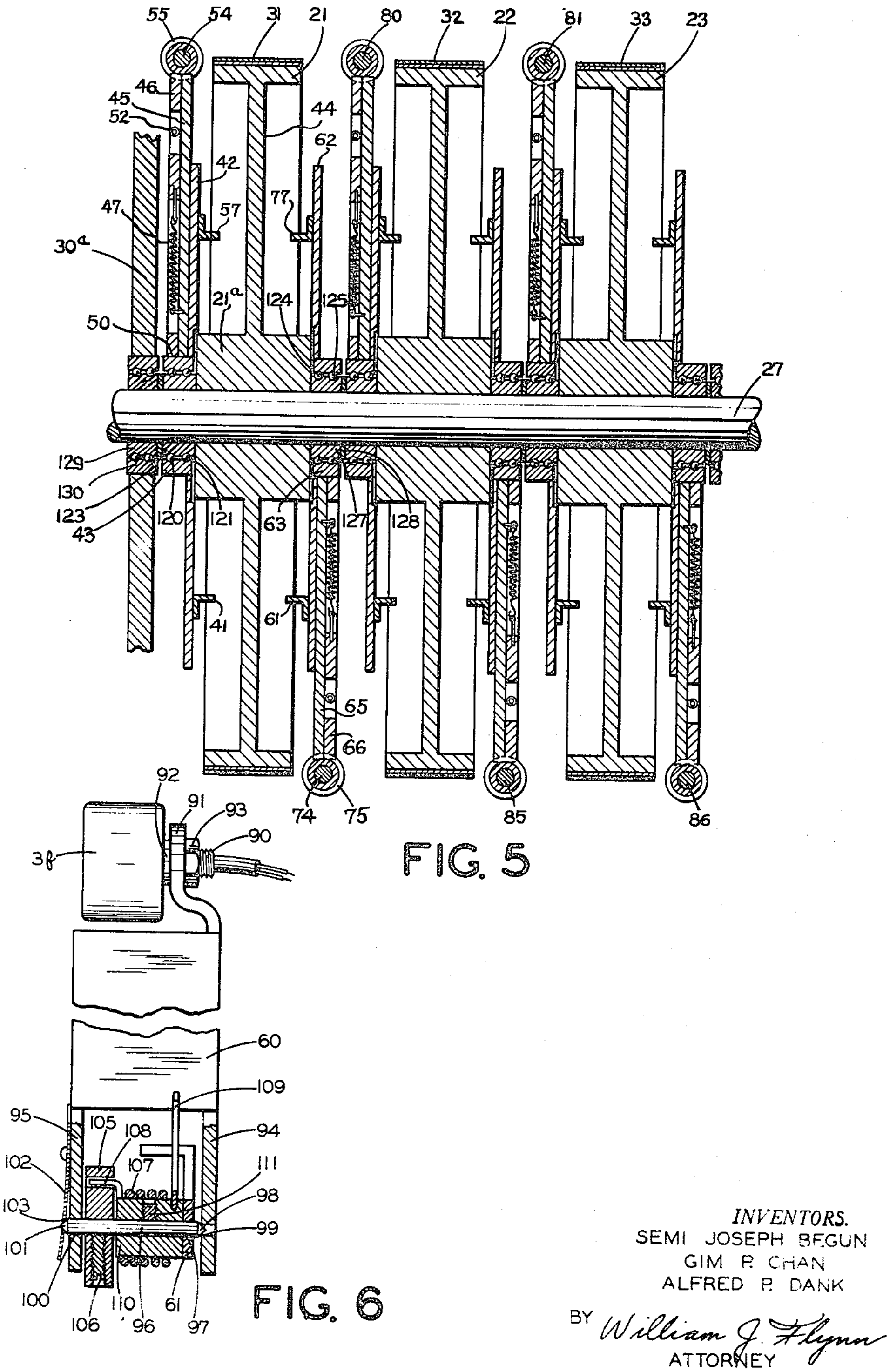
Figure 5 is a fragmentary section longitudinally through the drum assembly in the plural record apparatus.
Figure 6 is a plan view, partly in section, showing the mounting for the support bracket for each of the adjustable playback heads in the plural record apparatus.

In order to maintain each of the adjustable magnetic heads in contact with the underlying record in all positions of the head along the drum periphery, each of the heads has a mounting of the type shown in Fig. 6, which illustrates specifically the mounting of head 3f. This head mounting is essentially similar to that in the copending application of Alfred P. Dank et al., Serial No. 282,874, filed April 17, 1952, and assigned to the same assignee as the present invention which issued as Patent 2,769,-037 on October 30, 1956. The housing of head 3f carries a transversely projecting, threaded stud 90 which is received in a hole in the forward extension 91 of the support bracket 60. An enlarged transverse shoulder 92 integral with stud 90 is engaged by the inner face of the bracket extension 91, and a nut 93 threaded onto the outer end of stud 90 bears against the outer face in the bracket extension 91 to clamp the head 3f securely thereon.

At its end remote from the head 3f the bracket 60 is of bifurcated construction, presenting at its opposite sides a pair of spaced depending legs 94, 95. A pivot pin 96, which extends transversely between the legs 94 and 95, extends through a hole 97 in the outer end of the angle bar 61 to thereby mount the bracket 60 for head 3f pivotally on the angle bar 61. At one end the pivot pin 96 has its conical end 98 seated at a round hole 99 through the leg 94 at the inner face of the latter. Since the hole 99 is narrower than pin 96, the conical end 98 of this pin is capable of turning at its seat at hole 99. At its opposite end, the pin 96 projects snugly through a complementary hole 100 in the bracket leg 95 and presents a conical end 101 projecting beyond the outer face of this bracket leg. A leaf spring 102 is secured to the outer face of the bracket leg 95 and presents a hole 103, of the same size as the aforementioned hole 99, which receives the conical end 101 of the pivot pin 96. With this arrangement, the leaf spring 102 biases the pivot pin 96 to the right in Fig. 6 to maintain the conical end 98 of this pin seated at the hole 99 in the bracket leg 94.

A collar 105 encircles the pivot pin 96 and carries a set screw 106, by means of which the collar may be secured tightly to the pivot pin 96. One end of a torsion coil spring 107 is received in a cross hole 108 in the collar, while the opposite end 109 of this spring bears against the outer side of bracket 60, remote from the periphery of the underlying drum. A cylindrical sleeve 110, which is secured to the pivot pin 96 by a set screw 111, provides a mounting for the convolutions of the wire 107 between the latter's ends. In use, the set screw 106 is loosened and the collar 105 turned to wind up the spring 107 so that the end 109 of this spring exerts sufficient force on bracket 60 to maintain the head 3f in contact with the record on the drum periphery at all times, after which the set screw 106 is again tightened to maintain the parts in this condition.

Figure 5 illustrates the manner in which the various components of the plural record apparatus are mounted on the drum shaft 27. At the outer side of the drum 21, located at the left end of the drum assembly in Figs. 2 and 5, there are provided two rows of ball bearings 120, 121 enclosed between the outer race sleeve 43 and the inner race sleeve 123. The outer race sleeve 43 has a cylindrical outer periphery which has the center of shaft 27 as its axis and provides a bearing surface for the arcuate inner edge 50 on the outer gear sector 46. The gear sector assembly 45, 46 for head 2f which meshes with the worm 55 carried by shaft 54 is mounted for adjustment angularly about shaft 27 in unison with the outer race sleeve 43, as described above. The inner race sleeve 123 is slightly thicker than the outer race sleeve 43, so that the inner race sleeve bears against the hub 21a of drum 21, while the outer race sleeve does not. Likewise, the plate 42 which carries the angle bar 41 which supports head 2f is spaced slightly from the hub of drum 21. Similarly at the opposite side of drum 21 there are provided two rows of ball bearings 124, 125 located between the outer race sleeve 63 and the inner race sleeve 127. The outer race sleeve 63 is identical to the outer race sleeve 43 at the opposite side of drum 21. The gear sector assembly 65, 66 for head 3f which meshes with the worm 75 carried by shaft 74 is mounted for adjustment angularly about the shaft 27 in unison with the outer race sleeve 63. The inner race sleeve 127 is slightly thicker than the outer race sleeve 63 and bears against the hub 21a of drum 21, while the outer race sleeve 63 and the head supporting plate 62 do not.

At the next drum 22 there is provided a similar assembly of inner and outer race sleeves and double row ball bearings, with the inner race sleeve bearing against the hub of the drum. An annular washer 128 is disposed between the inner race sleeves at the inner side of drum 21 and at the adjacent side of the next drum 22.

In like manner, at each side of each drum along shaft 27 there are provided inner and outer race sleeves and double row ball bearings, with a washer disposed between each of the pairs of adjacent inner races. In each instance, the inner race bears against the hub of the corresponding drum while the outer race does not. Also, in each instance there is provided a gear sector assembly which supports a particular one of the magnetic heads mounted for adjustment angularly about the outer race sleeve of the corresponding ball bearing assembly.

Just beyond the end drum 21 the shaft 27 is supported rotatably by a ball bearing assembly which comprises inner and outer races 129 and 130 and balls located therebetween, this ball bearing assembly being mounted in the end wall 30*a* of the housing for the plural record apparatus. A washer 122 is interposed between the inner race 130 of the ball bearing assembly mounted on the housing wall 30*a* and the inner race 123 of the ball bearing assembly next to the outer side of drum 21.

In the assembly of the drums onto the shaft 27 the respective drums are slid onto the shaft successively, with the ball bearing and washer assemblies interposed between adjacent drums, as illustrated. The respective pairs of gear sectors forming the respective couplings from the adjustable shafts 54, 80—84, 74 and 85—89 to the magnetic head mountings are positioned on the respective outer sleeves of the ball bearing assemblies on opposite sides of the respective drums. Thus, these gear sectors are free for adjustment angularly about shaft 27. A nut (not shown) is threaded onto the opposite end of shaft 27 and is tightened to clamp each of the inner race sleeves, the washers and the drums onto the shaft, so that each of these elements is mounted to rotate in unison with shaft 27. The opposite end of shaft 27 is supported rotatably at the opposite end wall 30*a* of the housing 30.

In the use and operation of the present plural record apparatus, when the recorded information is transferred from the multichannel single record 17 to the several records 31—36, the magnetic recording/reproducing heads 2*f*—7*f* and 9*f*—14*f* are positioned with their recording/playback gaps in alignment, so that the respective information signals are re-recorded with the same phase relationship as originally recorded. Then, when it is desired to reproduce these signals from the several records 31—36 the magnetic heads 2*f*—7*f* and 9*f*—14*f* are adjusted selectively along their respective records to thereby vary the phase relationship among the channels. In one known technique, the reproduced signal information from the various channels would be supplied to photographic galvanometers to produce visual records.

While in the foregoing description and in the accompanying drawings there has been disclosed a specific preferred embodiment of the present invention, it is to be understood that various modifications, omissions and refinements which depart from the disclosed embodiment may be adopted without departing from the spirit and scope of this invention. For example, there may be more than a pair of adjustable magnetic heads associated with each drum in the plural record apparatus, each individual head being carried by its own support which is adjustable about the shaft on which the several drums are mounted. In such alternative embodiment there would be, of course, a plurality of record tracks on each record corresponding to the number of magnetic heads overlying that record. Also, the record supports in the plural record apparatus might be composed of one or more disks, rather than drums, mounted on a rotary shaft, with the record media carried on one or both of the flat faces on each disk and the respective record tracks being circular about the shaft and spaced apart radially from the shaft. In the case of a plurality of such disks, they would be mounted in axially spaced apart relation along a common rotary shaft. With such construction, the respective magnetic heads would be mounted on supports carried by the shaft and adjustable angularly about the shaft to adjust the respective positions of the magnetic heads along the individual record tracks. It will be apparent that such modified arrangement would incorporate the generic advantages of the present invention since the respective magnetic heads would be readily adjustable along the record tracks simply by adjusting their supports about the rotary shaft on which all of the record supports are mounted.

We claim:

1. In a re-recording and playback mechanism for multichannel magnetic recording, the combination of a rotary shaft, a plurality of drums having cylindrical peripheries mounted on said shaft to rotate therewith and spaced apart axially therealong, a corresponding plurality of magnetic records mounted on the respective peripheries of the drums, a plurality of pairs of rotary bearings mounted rotatably on the shaft at opposite sides of the drums for rotation of the shaft with respect to the bearings and for adjustment of the bearings about the shaft, support arms having rigid connections to the bearings and extending outward therefrom at opposite sides of the respective drums, brackets pivotally connected respectively to the outer ends of said support arms, and magnetic heads carried by said brackets to overlie respective signal tracks on the respective records mounted on the drum peripheries.

2. The combination of claim 1, wherein there are provided a plurality of gear sectors having connections respectively to said bearings and having toothed outer peripheries arcuate about the axis of the shaft, and a plurality of rotary worms meshing with said gear sectors for turning the latter about the axis of the shaft to shift the magnetic heads along the respective records.

3. The combination of claim 1, in which there are further provided a plurality of first gear sectors having rigid connections respectively to said bearings, a corresponding plurality of second gear sectors contiguously overlying said first gear sectors and separate therefrom, each pair of contiguous first and second gear sectors having their outer toothed peripheries in substantial alignment arcuately about the axis of said shaft, spring means acting between the first and second gear sectors of each pair to bias the teeth of one offset from the teeth of the other, and a plurality of rotary worms meshing with the gear teeth on the corresponding pairs of first and second gears to turn the latter about the axis of said shaft for shifting the respective magnetic heads along the records.

4. Multichannel magnetic recording and reproducing apparatus, comprising a rotary drum, a multichannel magnetic record on the periphery of the drum and having a plurality of signal channels in side-by-side relation, a plurality of magnetic heads extending contiguous to respective signal channels on said record and mounted with their respective recording/reproducing gaps extending in alignment across the record to record and reproduce the respective signals in a predetermined phase relation forming a multichannel head assembly, a rotary shaft, a plurality of drums having cylindrical peripheries mounted on said shaft to rotate therewith and spaced apart axially therealong, a corresponding plurality of magnetic records mounted on the drum peripheries, a plurality of pairs of rotary bearings mounted rotatably on the shaft at opposite sides of the drums for rotation of the shaft with respect to the bearings and for turning of the bearings about the shaft, support arms having rigid connections to the bearings and extending outward therefrom at opposite sides of the respective drums, brackets pivotally connected respectively to the outer ends of the support arms, magnetic heads carried by said brackets to extend contiguous to respective signal tracks on the respective records mounted on the drum peripheries, means for connecting the heads of the multichannel head assembly individually to respective ones of said latter heads as the multichannel record moves past the multichannel head assembly and said plurality of records move past said latter heads to reproduce the signals from the multichannel magnetic record and re-record said signals on said plurality of records in the same phase relation as originally recorded, and means for adjusting the respective positions of said bearings and support arms angularly about said shaft to adjust the positions of said latter heads along their respective record tracks for altering the phase relation among the re-recorded signals when the latter are reproduced.

References Cited in the file of this patent

UNITED STATES PATENTS

| | | |
|---|---|---|
| 2,293,593 | Clark | Aug. 18, 1942 |
| 2,427,421 | Rieber | Sept. 16, 1947 |
| 2,567,068 | Halmer | Sept. 4, 1951 |
| 2,611,813 | Sharpless et al. | Sept. 23, 1952 |
| 2,620,890 | Lee | Dec. 9, 1952 |
| 2,638,402 | Lee | May 12, 1953 |
| 2,683,254 | Anderson et al. | July 6, 1954 |
| 2,806,757 | Cunningham | Sept. 17, 1957 |